(12) United States Patent
Lestage et al.

(10) Patent No.: US 8,118,236 B2
(45) Date of Patent: Feb. 21, 2012

(54) BASEMENT VENTILATOR

(75) Inventors: Marc Lestage, Boudreau Ouest (CA); Patrick Boudreau, Boudreau Ouest (CA)

(73) Assignee: Air Tech Equipment Ltd., Boudreau Ouest, New Brunswick (CA)

( * ) Notice: Subject to any disclaimer, the term of this patent is extended or adjusted under 35 U.S.C. 154(b) by 877 days.

(21) Appl. No.: 11/851,195

(22) Filed: Sep. 6, 2007

(65) Prior Publication Data

US 2008/0073439 A1 Mar. 27, 2008

(30) Foreign Application Priority Data

Sep. 8, 2006 (CA) ..................................... 2558994

(51) Int. Cl.
| F24F 3/14 | (2006.01) |
| F24F 11/00 | (2006.01) |
| F24F 7/00 | (2006.01) |
| F24F 13/00 | (2006.01) |
| F24F 7/007 | (2006.01) |
| F24F 7/06 | (2006.01) |
| G05D 22/02 | (2006.01) |
| F25B 49/00 | (2006.01) |
| F25D 17/04 | (2006.01) |

(52) U.S. Cl. ................... 236/44 C; 236/44 A; 236/49.1; 236/49.3; 62/176.6; 454/237; 454/239; 454/341; 454/343

(58) Field of Classification Search ................ 236/44 A, 236/44 C, 49.3; 62/176.6, 186; 454/237, 454/239, 241, 246, 247, 341, 343, 354
See application file for complete search history.

(56) References Cited

U.S. PATENT DOCUMENTS

| 2,986,904 A * | 6/1961 | Williamson ..................... 62/429 |
| 3,625,629 A * | 12/1971 | Morrison et al. .............. 415/157 |
| 4,510,851 A * | 4/1985 | Sarnosky et al. .............. 454/346 |
| 5,092,520 A * | 3/1992 | Lestage ........................ 236/44 A |
| 6,021,953 A * | 2/2000 | Swan ........................... 236/44 A |
| 2008/0230206 A1 * | 9/2008 | Lestage et al. ............... 165/48.1 |

* cited by examiner

*Primary Examiner* — Frantz Jules
*Assistant Examiner* — Daniel C Comings
(74) *Attorney, Agent, or Firm* — Buchanan Ingersoll & Rooney PC

(57) ABSTRACT

A basement ventilator for use in a building to reduce basement humidity and increase basement air circulation, the basement ventilator includes a household inlet duct for receiving and ducting household air of the building; an interior exhaust vent in communication with the household inlet duct for venting the household air into the basement; a basement air inlet duct for receiving humid air from a lower region of the basement of the building; an exterior exhaust vent in communication with the basement air inlet duct and the outside of the building for venting the humid air from the basement of the building to the outside; and a fan device in communication with the household inlet duct, the interior exhaust vent, the basement air inlet duct and the exterior exhaust vent for drawing household air into the household inlet duct and exhausting the household air into the basement through the interior exhaust vent and for drawing air from the lower region of the basement into the basement air inlet duct and exhausting it to the outside of the building via the exterior exhaust vent.

15 Claims, 4 Drawing Sheets

BASEMENT VENTILATOR

TECHNICAL FIELD

The present invention relates to a humidity control device for humidity transfer and control during ventilation of a basement or crawlspace portion of a building such as a home or other residence.

BACKGROUND

New and better construction methods and materials for building structures such as single homes, attached homes, and other residences have resulted in more air tight construction, to the point where ventilation has become an air quality issue whereby humidity control is a necessity for both new home construction as well as major home renovation projects.

Summertime humid air infiltration into a structure can lead to mold formation resulting in structural damage and health issues. Further, increased air conditioning is required and as a result, increased energy requirements.

This movement/infiltration of air from either the outside or other areas of the structure to the basement or crawl space, where temperatures are lower, results in condensation, which can lead to mold formation and odours and resultant health issues. Structural damage in the basement/crawl space may also result.

Mold and resulting mildew conditions are considered to be health hazards and a major contributor to asthmatic conditions, especially in children.

A negative air pressure can occur in the basement/crawl space of a home as a result of the new and better construction methods and ventilation devices. When a negative air pressure exists, outside air and other gases are drawn into the basement/crawl space and have a negative impact on the structure of the home and the occupants thereof. Current house ventilation systems do not address the issues of negative air pressure and their impact on basement/crawl space humidity and condensation, during periods of high temperatures and humidity.

Temperature and humidity levels of supply air during periods of high or extreme heat, humidity or cold, delivered by current house ventilation systems, are such that significant energy expenditures are needed to maintain comfort levels.

There are a number of basement or crawlspace systems commercially available that attempt to address the basement and/or crawlspace humidity and condensation problem. However, they are ineffective during prolonged summertime periods with high temperature and humidity. Additionally, these systems add a considerable load to the energy requirements for air conditioning.

Current commercially available basement and crawlspace systems do not meet the requirements for all North American climates (coastal, southern, northern, etc.) as well as the building codes in these different jurisdictions.

De-humidifiers address localized indoor humidity problems, however, they are very costly to operate and do not address indoor air quality. Heat recovery ventilators (HRV) and energy recovery ventilators (ERV) are likewise costly to operate from a strictly operating point.

In order to reduce costs to the end user, reduce energy demand from utilities and reduce $CO_2$ emissions on a greater scale, energy savings must be promoted.

There is therefore a need for a ventilation system which controls humidity, reduces costs of air-conditioning during the summertime and increases humidity control efficiency during continuous hot and humid days.

SUMMARY OF INVENTION

Embodiments of the present invention provide for a humidity control system for use in the lowers levels of buildings such as basements or crawlspaces, hereinafter collectively referred to as basements.

Further embodiments of the present invention provide for a humidity control system having a higher efficiency than existing basement exhaust ventilators in terms of controlling the humidity more quickly or in larger spaces at the same rates and reducing the burden on heating and cooling systems.

Further embodiments of the present invention provide for a humidity control system for reducing exhaust rates to the outside from existing basement ventilators.

Further embodiments of the present invention provide for a humidity control system for balancing and/or positively pressurizing the basement area by mechanically forcing air from the household to downstairs.

Further embodiments of the present invention provide for a humidity control system for minimizing cross contamination of exhaust air with household replenishing air. As such, in the present embodiment, exhaust air is substantially made up of basement air and not household air.

In one illustrative embodiment, there is provided a basement ventilator for use in a building to reduce basement humidity and increase basement air circulation, the basement ventilator comprising:
- a household inlet duct for receiving and ducting household air of the building;
- an interior exhaust vent in communication with the household inlet duct for venting the household air into the basement;
- a basement air inlet duct for receiving humid air from a lower region of the basement of the building;
- an exterior exhaust vent in communication with the basement air inlet duct and the outside of the building for venting the humid air from the basement of the building to the outside; and
- a fan device in communication with the household inlet duct, the interior exhaust vent, the basement air inlet duct and the exterior exhaust vent for drawing household air into the household inlet duct and exhausting the household air into the basement through the interior exhaust vent and for drawing air from the lower region of the basement into the basement air inlet duct and exhausting it to the outside of the building via the exterior exhaust vent.

In another illustrative embodiment, there is provided a method of reducing basement humidity and increasing basement air circulation in a building, the method comprising the steps of:
i) drawing air via a first duct from a household region of the building into the basement; and
ii) exhausting humid basement air via a second duct from a lower region of the basement to the outside of the building.

DETAILED DESCRIPTION

A basement ventilator for controlling humidity levels is provided. The basement ventilator comprises one fan for moving exhaust air collected from the basement floor, and the same or another fan for forcing household air to the basement to control basement humidity and to create a balanced or positive pressure in the basement.

As used herein, the term household includes the floors or region of a building above the basement level, below ground level, or partially below ground level of the building. The term household also includes any upstairs level or region of the building.

Figure 1:
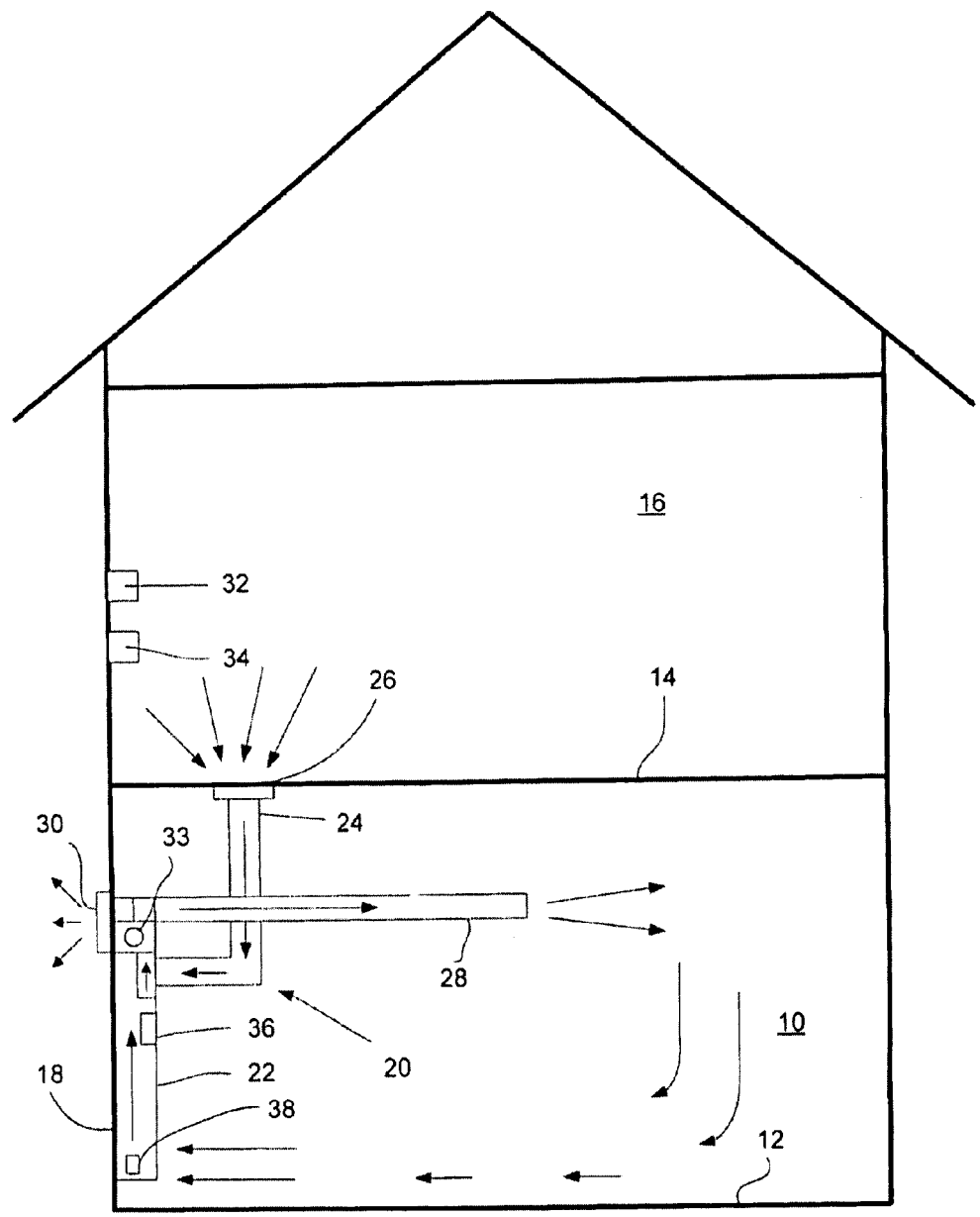
FIG. 1 is a diagram illustrating a basement ventilator according one embodiment.

FIG. 1 shows an example of one embodiment of a basement ventilator shown generally at 20 for use in a basement 10 of a building. The building has a basement floor 12 and a household area 16. A basement ceiling 14 separates the basement 12 and the household area 16. Basement wall 18 may be partially below ground, and may have windows. The basement ventilator 20 comprises an inlet 26 for receiving household air through an inlet duct 24. A ventilator fan 33 draws household air through the inlet 26 and into the inlet duct 24. The basement ventilator 20 further comprises a basement duct 22 having a basement inlet 38 for receiving basement air in general proximity to the basement floor 12 and an exhaust port 30 for exhausting the basement air that has been drawn into the basement duct 22. The exhaust port 30 may be located in a window space or through the basement wall 18. Basement air is drawn into the basement duct 22 via the ventilator fan 33 and is exhausted exterior the home through the exhaust port 30. It is to be noted that the closer the basement inlet 38 is positioned to the floor, the greater the efficiency in removing humidity, although the ventilator will still function with the inlet 38 positioned halfway to the ceiling or even closer.

The basement duct 22 comprises an exterior exhaust channel and an interior exhaust channel which will be discussed in detail further below. In this embodiment, the exterior exhaust channel and the interior exhaust channel are both in communication with the ventilator fan 33. The interior exhaust channel is connected at one inlet end to the inlet duct 24 and at the other end to an outlet duct 28 for exhausting into the basement air drawn from the household through the inlet 26 and the inlet duct 24. The exhausting of household air into the basement allows for air to be withdrawn through the basement inlet 38 and directed through the exterior exhaust channel for discharge into the exterior atmosphere. At substantially the same time household air is drawn and exhausted into the basement via inlet 26 and inlet duct 24 using the ventilator fan 33.

The stalest and dampest air in a building is normally found in the basement in proximity to the basement floor. By drawing the stale and damp air found proximate the basement floor 12 into the basement inlet 38 and exhausting it to the atmosphere outside the building, basement humidity can be reduced, and mold and mildew development can be reduced or even eliminated.

Replenishing air drawn from the household to the basement area of the building to replace air which was exhausted, is circulated through the basement 10 creating a circulation pattern, minimizing dead/stale air zones and balancing or creating a positive basement pressure to thereby minimize the ingress of outside air or other gases through cracks and crevices in the basement wall 18. The replenishment air drawn from the household 16 heats remaining humid basement air reducing its relative humidity for further humidity control.

To increase circulation of the basement air, the outlet duct 28 can be placed in the upper region of the basement 10 and proximate the basement ceiling 14. Additionally, circulation of the basement air is increased without the need for an increased volume of exhausted basement air. Further efficiency can be observed as distance between the output of the outlet duct 28 and the basement inlet 38 is increased.

A humidity sensor 32 and a temperature sensor 34 may be incorporated into the basement ventilator for measuring the household humidity and temperature levels, respectively, thereby allowing for more efficient operation of the basement ventilator. The humidity sensor 32 and the temperature sensor 34 feed a microprocessor 36 which determines the household dew point and operates the ventilator fan 33 as required. In this way, it may be determined if the basement ventilator is a burden on the system, causing an unnecessary or undesirable loss of energy, heat, or humidity based on the upstairs conditions, and operation of the basement ventilator may be adjusted accordingly. For example, as the household conditions become extreme to the point where it becomes a burden on the air conditioning system of the building and minimal gain on humidity control is predicted or anticipated, the outside exhaust will be minimized while the household 16 to basement 10 circulation pattern remains. This is done by using a valve or baffle controlled by the microprocessor 36 for partially or fully blocking the exterior exhaust channel in the basement duct 22. By maintaining or allowing for upstairs household air to be drawn into the basement and reducing exhaust from the basement, the pressure of the basement is balanced or a positive pressure can be induced.

The basement ventilator may further comprise a humidistat for measuring the relative humidity in the basement. The relative humidity is input into the microprocessor 36 and the fan speed and/or the rate of exterior exhaust is adjusted accordingly. For example, if the basement humidity is below a predetermined threshold, for example 50% humidity, the exterior exhaust is minimized by adjusting the flaps and/or the fan speed. Alternatively, if the basement humidity is above the predetermined threshold, the exterior exhaust is increased or maximized by adjusting the flaps and/or the fan speed.

Figure 2:
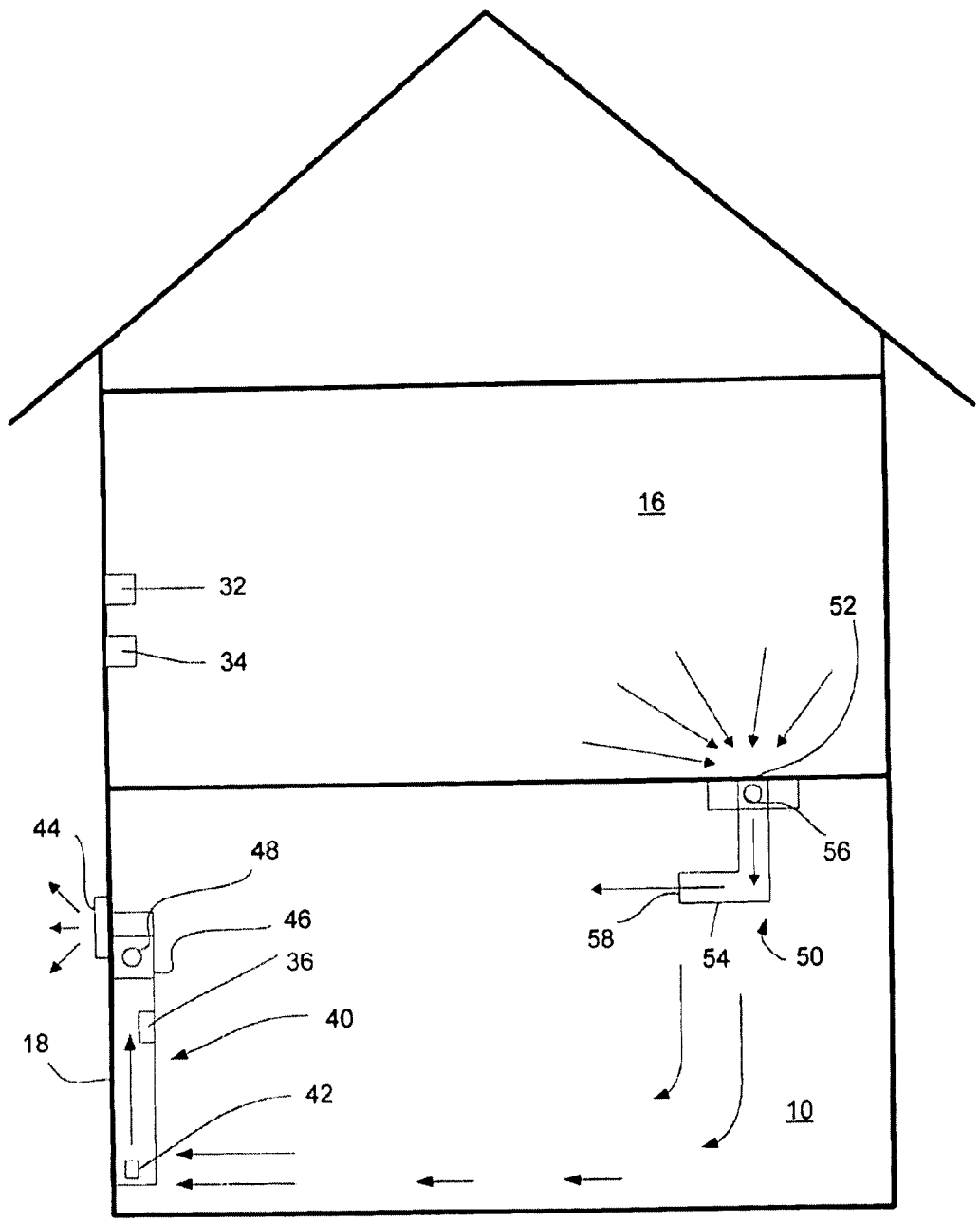
FIG. 2 is a diagram illustrating a basement ventilator according to another embodiment.

An example of an alternative two-fan basement ventilator is shown in FIG. 2. The basement ventilator comprises of two units, an exhaust unit 40 and a transfer unit 50.

The exhaust unit 40 has an exhaust fan 48 for drawing basement air in through a basement air inlet 42 and exhausting it out to the outside atmosphere through an exhaust outlet 44. As in the basement ventilator described with reference to FIG. 1, for greater efficiency the air inlet 42 is placed in proximity to the basement floor 12 to draw in cooler more humid air which is situated in the lower regions of the basement 10. By drawing the stale and damp air found proximate the basement floor 12 into the basement air inlet 42 and exhausting it to the atmosphere outside the home or building basement humidity may be reduced and mold and mildew can be reduced or substantially eliminated.

The transfer unit 50 has a household inlet 52 through which air from the household 16 is drawn by a transfer fan 56. The household air is directed through a transfer duct 54 and exhausted into the basement through the interior outlet 58. As outlined above with reference to FIG. 1, replenishing air drawn from the household to the basement area of the building replaces air which was exhausted and is circulated through the basement 10 creating a circulation pattern, minimizing dead stale zones and balancing or creating a positive basement pressure to thereby minimize the ingress of outside air or other gases through cracks and crevices in the basement wall 18. The replenishment air drawn from the household 16 replaces humid basement air, thereby reducing its relative humidity for further humidity control.

To increase circulation of the basement air, the transfer unit 50 may be placed as great a distance as practical from the exhaust unit 40 to thereby ensure maximum travel of the household air and, as such, circulation of the basement air. Additionally, circulation of the basement air is increased without the need for an increased volume of exhausted basement air.

Similar to the basement ventilator described with reference to FIG. 1, a humidity sensor 32 and a temperature sensor 34 can be incorporated into the exhaust unit 40 of the basement ventilator for measuring the household humidity and temperature levels, respectively, thereby allowing for efficient operation of the basement ventilator. The humidity sensor 32 and the temperature sensor 34 feed a microprocessor 36 which determines the dew point and operates the ventilator fan 33 as required. In this way, it may be determined if the basement ventilator is a burden on the system, based on outside conditions, and operation of the basement ventilator may be adjusted accordingly. For example, as the household conditions become extreme to the point where it becomes a burden on the air conditioning system of the building and minimal gain on humidity control is predicted, the outside exhaust will be minimized while the household to basement circulation pattern remains.

Alternatively, the humidity sensor 32 and the temperature sensor 34 may be located outside of the building to measure outside temperature and allow for the outside dew point to be calculated. Additional sensors may be used for taking outside measurements in conjunction with household measurements taken by the humidity sensor 32 and the temperature sensor 34.

The 2-fan basement ventilator may further comprise a humidistat for measuring the relative humidity in the basement. The relative humidity is input into the microprocessor 36 and the ventilator fan speed and/or the rate of exterior exhaust is adjusted accordingly. For example, if the basement humidity is below a predetermined threshold, for example 50% humidity, the exterior exhaust is minimized by adjusting the flaps and/or the ventilator fan speed. Alternatively, if the basement humidity is above the predetermined threshold, the exterior exhaust is increased or maximized by adjusting the flaps and/or the ventilator fan speed.

Figure 3:
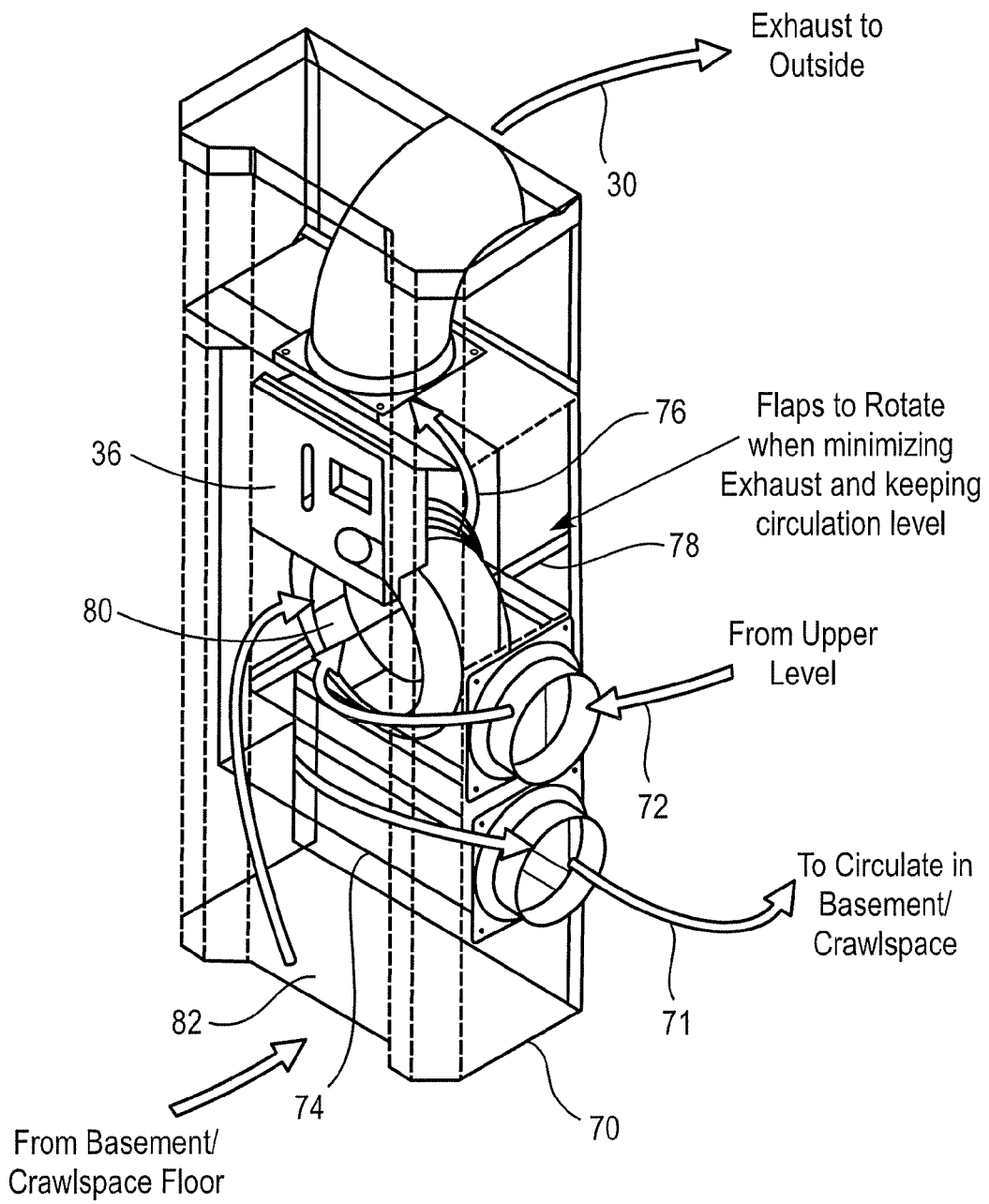
FIG. 3 is a cutaway view illustrating a single fan basement ventilator according to one embodiment.

FIG. 3 is an illustrative embodiment of a single fan basement duct 70 for performing the same function to that used with reference to FIG. 1. The single fan basement duct 70 has a single fan 80 for drawing air into the basement duct 70 and exhausting air out of the basement duct 70. The single fan 80 is in communication with an exterior exhaust channel 76 and an interior exhaust channel 74. The exterior exhaust channel 76 has an inlet port 82 for receiving humid basement air in general proximity to a basement floor and an exhaust port for exhausting the humid basement air into the outside atmosphere. The interior exhaust channel 74 has an interior inlet port 72 for connection to an inlet duct 24 (as described with reference to FIG. 1) for receiving household air and an interior outlet port 71 for connection to an outlet duct 28 (as described with reference to FIG. 1) for exhausting household air into the basement. As the single fan 80 is in communication with both exhaust channels 74 and 76, operation of the fan can draw air into each channel 74 and 76 and exhaust it out of each outlet port 30 and 71.

A microprocessor 36 receives temperature and humidity reading from sensors, situated, for example in the household, and calculates a dew point based on the temperature and humidity. Using the dew point, the microprocessor then uses an algorithm for determining the operation of the single fan 80 for efficiently reducing the humidity in the basement while maintaining circulation. One or more flaps 78 or dampers located in the exterior exhaust channel 76 may be incrementally moved between an open position for allowing a maximum amount of flow to a restricted position to reduce the amount of exterior exhaust emitted by the basement duct 70. The flaps 78 are controlled by the microprocessor which determines an efficient amount of exterior exhaust based on the calculated dew point and preset operating parameters, for example house size, basement size, minimum temperatures, maximum temperatures, minimum humidity and maximum humidity.

An illustrative method of the operation of the microprocessor 36 and the basement duct 70 will be described in detail below with reference to FIG. 4.

Figure 4:
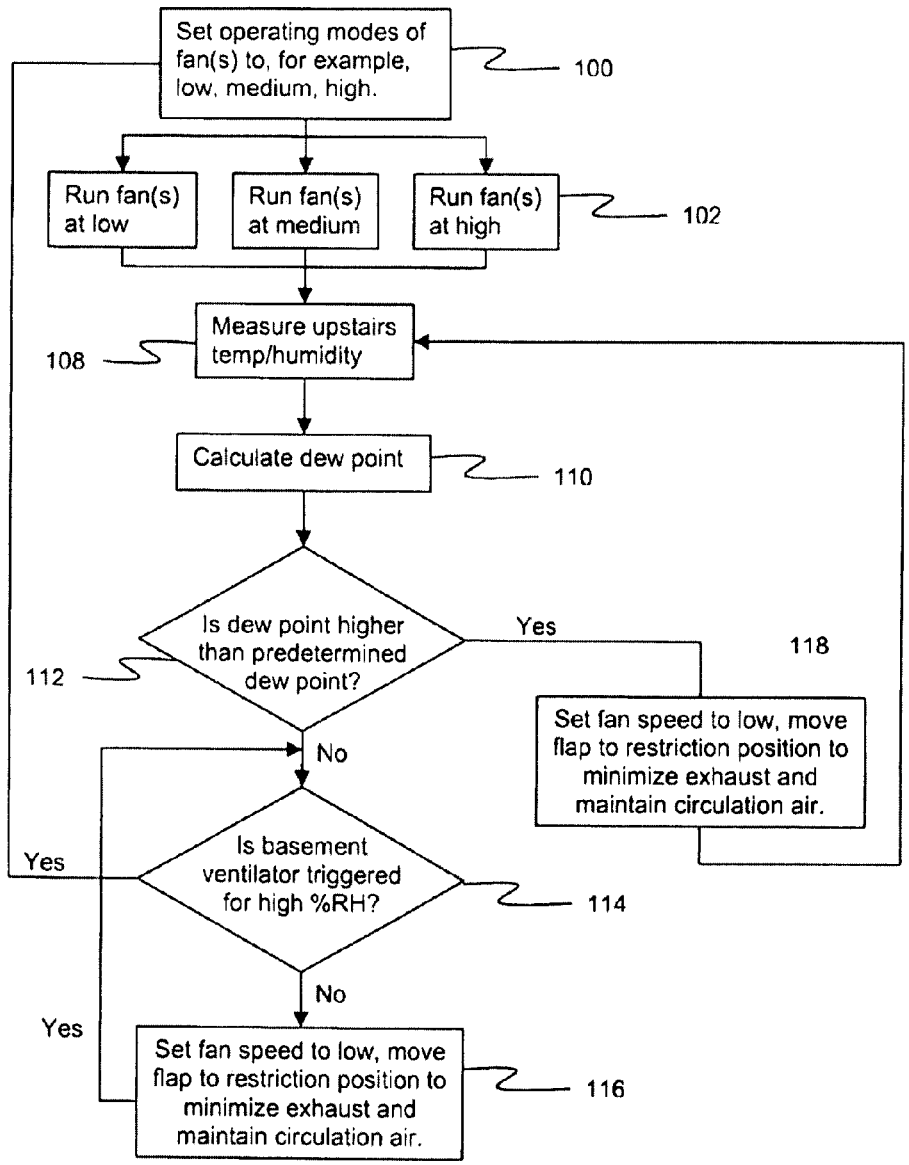
FIG. 4 is a flow chart illustrating a method of operation of a basement ventilator according to one embodiment.

FIG. 4 is a flowchart of an illustrative method of operating a basement ventilator system. In step 100, an operating fan speed is selected from, for example, low, medium and high. Each fan speed is selected based on one or more of the following: house size, basement size, humidity level, temperature level, etc. In step 102 the fan is operated at the selected setting of, for example, low, medium or high. In step 108 the upstairs humidity and temperature is read using humidity sensor 32 and temperature sensor 34, respectively. This information is input into the microprocessor 36 and the dew point is calculated in step 110. In step 112, it is determined if the dew point is above a predetermined programmed minimum, for example 18° C. If the dew point is above 18° C., the method proceeds to step 118 where the fan speed is reduced to low and the flaps 78 are positioned to minimize exhaust into the outside atmosphere and maintain circulation of household air in the basement. The method then returns to step 108 and the dew point is recalculated based on the temperature and humidity readings. If the dew point is below the programmed minimum, for example 18° C., the method proceeds to step 114 where it is determined if the basement ventilator is triggered for high relative humidity based on measurements taken from a humidistat located in the basement and input to the microprocessor 36. If the basement ventilator is triggered for high relative humidity (for example above 50% humidity) the method returns to step 100 and an operating fan speed is selected. If the basement ventilator is not triggered for high relative humidity, step 116 is carried out and the fan speed is reduced to low and the flaps 78 are positioned to minimize exhaust into the outside atmosphere and maintain circulation of household air in the basement. At this point, the method returns to 114 and it is re-evaluated if the basement ventilator is triggered for high relative humidity based on the relative humidity level measured by a humidistat in the basement in communication with the microprocessor.

While the invention has been described with reference to illustrative embodiments thereof, it will be apparent to those skilled in the art upon a reading of the foregoing that numerous basement ventilators other than the specific illustrated embodiments are attainable, which lie within the spirit and scope of the present invention. It is intended to include all such designs, and equivalents thereof within the scope of the appended claims.

We claim:

1. A basement ventilator for use in a building to reduce basement humidity and increase basement air circulation, the basement ventilator comprising:

a household inlet duct for receiving and ducting household air of the building;

an interior exhaust vent in communication with the household inlet duct for venting the household air into the basement, the household inlet duct and the interior exhaust vent defining an interior exhaust channel;

a basement air inlet duct for receiving humid air from a lower region of the basement of the building;

an exterior exhaust vent in communication with the basement air inlet duct and the outside of the building for venting the humid air from the basement of the building to the outside, the basement air inlet duct and the exterior exhaust vent defining an exterior exhaust channel; and a fan in direct communication with both the interior exhaust channel and the exterior exhaust channel, wherein the interior exhaust channel communicates with the exterior exhaust channel at the location of the fan.

2. The basement ventilator according to claim 1, further comprising:

a closure device in the exterior exhaust vent incrementally moveable between an open position whereby a rate of flow of the humid air from the lower region of the basement is maximized and a restricted position whereby the rate of flow of the humid air from the lower region of the basement is minimized.

3. The basement ventilator according to claim 2, further comprising:

a humidity sensor in the building for measuring a humidity of the household air;

a temperature sensor in the household of the building for measuring a temperature of the household air; and a microprocessor in communication with the humidity sensor and the temperature sensor, the microprocessor executing:

a first algorithm for calculating a dew point of the household air based on the temperature and the humidity of the household air, and a second algorithm for controlling a speed of the fan device and the position of the closure device based on the calculated dew point and a predetermined minimum dew point;

wherein the speed of the fan device is reduced and the closure device is moved toward the restricted position when the calculated dew point is below the predetermined minimum dew point and the speed of the fan device is increased and the closure device is moved toward the open position when the calculated dew point is above the predetermined minimum dew point.

4. The basement ventilator according to claim 3, further comprising a humidistat in communication with the microprocessor for measuring a relative humidity of the basement and providing the relative humidity to the microprocessor.

5. The basement ventilator according to claim 1, wherein the household inlet duct, the interior exhaust vent, the basement air inlet duct, the exterior exhaust vent and the fan device form a single structure.

6. The basement ventilator according to claim 3, wherein the closure device is moved toward the restricted position for balancing or creating a positive basement pressure.

7. The basement ventilator according to claim 1, wherein the basement air inlet duct is positioned no more than 48 inches from the basement floor.

8. The basement ventilator according to claim 1, wherein the basement air inlet duct is positioned within 12 inches from the basement floor.

9. A method of reducing basement humidity and increasing basement air circulation in a building, the method comprising the steps of:

i) drawing air via an interior exhaust channel, through a fan, from a household region of the building into a basement of the building; and ii) exhausting humid basement air via an exterior exhaust channel from a lower region of the basement to the outside of the building;

wherein the fan is in direct communication with both the interior exhaust channel and the exterior exhaust channel, and wherein the interior exhaust channel communicates with the exterior exhaust channel at the location of the fan.

10. The method of claim 9, further comprising the steps of:

iii) calculating a dew point of the household region of the building; and iv) controlling an exhaust rate of the humid basement air and an ingress rate of the air from the household region of the building based on a comparison of the calculated dew point and a predetermined minimum dew point.

11. The method of claim 10, wherein the exhaust rate is minimized and the ingress rate is maintained when the calculated dew point is below the predetermined minimum dew point.

12. The method of claim 10, wherein the exhaust rate is maximized and the ingress rate is maximized when the calculated dew point is above the predetermined minimum dew point.

13. The method of claim 10, further comprising the steps of:

v) measuring a relative humidity of the basement of the building; and vi) controlling the rate of exhaust of the humid basement air based on the relative humidity of the basement.

14. The method of claim 13, wherein the exhaust rate is maximized when the relative humidity of the basement is above a predetermined threshold.

15. The method of claim 13, wherein the exhaust rate is minimized when the relative humidity of the basement is below a predetermined threshold.

* * * * *